(12) United States Patent
Sun et al.

(10) Patent No.: US 11,323,878 B2
(45) Date of Patent: May 3, 2022

(54) BSS PCP/AP CLUSTER NETWORK REFERENCE ARCHITECTURE

(71) Applicants: Sheng Sun, Ottawa (CA); Yan Xin, Ottawa (CA); Wen Tong, Ottawa (CA); Kwok Shum Au, Ottawa (CA); Osama Aboul-Magd, Ottawa (CA)

(72) Inventors: Sheng Sun, Ottawa (CA); Yan Xin, Ottawa (CA); Wen Tong, Ottawa (CA); Kwok Shum Au, Ottawa (CA); Osama Aboul-Magd, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/011,840

(22) Filed: Sep. 3, 2020

(65) Prior Publication Data
US 2020/0404500 A1    Dec. 24, 2020

Related U.S. Application Data

(62) Division of application No. 15/894,251, filed on Feb. 12, 2018, now Pat. No. 10,790,948.

(60) Provisional application No. 62/484,135, filed on Apr. 11, 2017, provisional application No. 62/484,112, filed on Apr. 11, 2017.

(51) Int. Cl.
| | |
|---|---|
| *H04W 16/28* | (2009.01) |
| *H04W 12/062* | (2021.01) |
| *H04L 5/00* | (2006.01) |
| *H04W 56/00* | (2009.01) |
| *H04W 72/04* | (2009.01) |
| *H04W 12/06* | (2021.01) |
| *H04W 92/10* | (2009.01) |
| *H04W 80/02* | (2009.01) |

(Continued)

(52) U.S. Cl.
CPC ......... *H04W 12/062* (2021.01); *H04L 5/0035* (2013.01); *H04W 12/06* (2013.01); *H04W 16/28* (2013.01); *H04W 56/001* (2013.01); *H04W 72/042* (2013.01); *H04W 72/046* (2013.01); *H04W 72/0433* (2013.01); *H04W 80/02* (2013.01); *H04W 84/12* (2013.01); *H04W 88/12* (2013.01); *H04W 92/10* (2013.01)

(58) Field of Classification Search
None
See application file for complete search history.

(56) References Cited

U.S. PATENT DOCUMENTS

| | | |
|---|---|---|
| 2005/0124294 A1 | 6/2005 | Wentink |
| 2006/0094400 A1 | 5/2006 | Beachem |

(Continued)

FOREIGN PATENT DOCUMENTS

| | | |
|---|---|---|
| CN | 101300786 A | 11/2008 |
| CN | 104113905 A | 10/2014 |

*Primary Examiner* — Kodzovi Acolatse

(57) ABSTRACT

An apparatus for wireless communications. The apparatus includes a network interface configured for wireless communication with one or more personal basic service set (PBSS) control points (PCPs)/access points (APs) serving in one BSS PCP/AP cluster (BPAC) basic service set (BSS). The processor is coupled to the network interface and configured to: transmit synchronization signals to one or more electronic devices (EDs) of the one BPAC BSS and to the one or more PCP/APs of the one BPAC BSS to synchronize transmissions within the one BPAC BSS.

20 Claims, 10 Drawing Sheets

(51) Int. Cl.
  *H04W 84/12* (2009.01)
  *H04W 88/12* (2009.01)

(56) References Cited

U.S. PATENT DOCUMENTS

| | | | |
|---|---|---|---|
| 2010/0317388 A1* | 12/2010 | Chu | H04L 5/0037 |
| | | | 455/509 |
| 2011/0199966 A1* | 8/2011 | Cordeiro | H04W 16/14 |
| | | | 370/328 |
| 2013/0156016 A1 | 6/2013 | Debnath et al. | |
| 2014/0169288 A1 | 6/2014 | Cordeiro | |
| 2014/0362840 A1 | 12/2014 | Wong | |
| 2015/0131468 A1 | 5/2015 | Navarro | |
| 2015/0358885 A1 | 12/2015 | Choi | |
| 2016/0007234 A1* | 1/2016 | Li | H04W 40/244 |
| | | | 370/329 |
| 2016/0198393 A1* | 7/2016 | Li | H04W 40/246 |
| | | | 370/338 |
| 2016/0302063 A1 | 10/2016 | Ahmed | |
| 2016/0316484 A1* | 10/2016 | Feng | H04W 72/0446 |
| 2017/0347360 A1 | 11/2017 | Beattie, Jr. | |
| 2018/0184450 A1 | 6/2018 | Cavalcanti | |
| 2018/0206139 A1* | 7/2018 | Wang | H04B 7/15507 |
| 2018/0295567 A1 | 10/2018 | Ko | |
| 2018/0359799 A1 | 12/2018 | Huang | |
| 2019/0021091 A1 | 1/2019 | Ko | |
| 2019/0150063 A1 | 5/2019 | Chu | |
| 2019/0349782 A1* | 11/2019 | Kim | H04W 16/28 |
| 2021/0204324 A1* | 7/2021 | Viger | H04W 72/121 |

\* cited by examiner

BSS PCP/AP CLUSTER NETWORK REFERENCE ARCHITECTURE

CROSS-REFERENCE TO RELATED APPLICATIONS

The present disclosure is a divisional of U.S. patent application Ser. No. 15/894,251; which claims priority from both U.S. provisional patent application No. 62/484,112, entitled "BSS PCP/AP CLUSTER NETWORK REFERENCE ARCHITECTURE", filed Apr. 11, 2017; and U.S. provisional patent application No. 62/484,135, entitled "SYNCHRONIZED BSS PCP/AP CLUSTER SERVICE SET", filed Apr. 11, 2017; the entireties of which are hereby incorporated by reference.

FIELD

The present disclosure relates to a reference architecture for and management of BSS PCP/AP clusters, including synchronization of such clusters.

BACKGROUND

In wireless communications, a personal basic service set (PBSS) control point (PCP) or access point (AP) typically serves to manage communications between the PCP/AP and stations, and communications among stations (STAs) in the network. Each STA may associate with a PCP or AP to associate with the network and gain access to network resources.

In IEEE 802.11ad, clustering of PCPs or APs may be used to improve spatial sharing and/or interference mitigation with other co-channel directional multi-gigabit (DMG) basic service sets (BSSs). Typically a synchronization PCP (S-PCP) or synchronization AP (S-AP) provides synchronization and other services to a PCP/AP cluster. A member in the PCP/AP cluster transmits its DMG beacon frame during one of the beacon service periods (SPs).

A new reference architecture may be required to support new usage models and new desired functions, including provision of services with higher throughput and lower latency, suitable for a future generation of the IEEE 802.11ad/ay standard.

SUMMARY

Examples described herein may provide a network architecture that enables high density, high throughput and low latency wireless communications. Further, the examples described herein may permit backward compatibility with existing or legacy network architecture.

Examples described herein may also provide a synchronization mechanism for synchronization of BPAC BSSs. A synchronization abstract MAC layer is described.

In some example aspects, the present disclosure describes an apparatus for wireless communications including: a network interface configured for wireless communication with one or more personal basic service set (PBSS) control points (PCPs)/access points (APs) serving in one BSS PCP/AP cluster (BPAC) basic service set (BSS); and a processor coupled to the network interface and configured to: transmit synchronization signals to one or more electronic devices (EDs) of the one BPAC BSS and to the one or more PCP/APs of the one BPAC BSS to synchronize transmissions within the one BPAC BSS.

In any of the examples, the synchronization signals may be transmitted via a synchronization layer at least partially implemented by the apparatus in a media access control (MAC) layer, and synchronization signals within the one BPAC BSS may be transmitted via the synchronization layer.

In any of the examples, the one BPAC BSS may include a coordinator PCP/AP and at least one member PCP/AP, the coordinator PCP/AP further coordinating communications among PCP/APs within the one BPAC BSS.

In any of the examples, the network interface may be configured for wireless communication with at least one PCP/AP in each of two or more BPAC BSSs, and the processor may be configured to transmit synchronization signals to the respective PCP/APs of the two or more BPAC BSSs to synchronize transmissions between the two or more BPAC BSSs.

In any of the examples, the apparatus may be an inter BPAC BSS PCP/AP that operates within each of the two or more BPAC BSSs.

In any of the examples, each BPAC BSS may be represented as a respective single virtual PCP/AP, and the synchronization layer may synchronize the two or more BPAC BSSs across the virtual PCP/APs.

In any of the examples, the processor may be configured to relay communications between the two or more BPAC BSSs.

In any of the examples, there may be two or more PCP/APs serving within the one BPAC BSS, and the processor may be further configured to implement a single virtual PCP/AP, the single virtual PCP/AP providing a representation of all PCP/APs in the one BPAC BSS as the single virtual PCP/AP.

In some example aspects, the present disclosure describes an apparatus for wireless communications, the apparatus including: a network interface configured for wireless communication with at least one or personal basic service set (PBSS) control points (PCPs)/access points (APs) serving in each of two or more BSS PCP/AP cluster (BPAC) basic service sets (BSSs); and a processor coupled to the network interface and configured to: transmit synchronization signals to the PCP/APs of the two or more BPAC BSSs to synchronize transmissions between the two or more BPAC BSSs.

In any of the examples, the synchronization signals may be transmitted via a synchronization layer at least partially implemented by the apparatus in a media access control (MAC) layer, and the synchronization signals to the two or more BPAC BSSs may be transmitted via the synchronization layer.

In any of the examples, the apparatus may be an inter BPAC BSS PCP/AP that operates within each of the two or more BPAC BSSs.

In any of the examples, each BPAC BSS may be represented as a respective single virtual PCP/AP, and the synchronization layer may synchronize the two or more BPAC BSSs across the virtual PCP/APs.

In any of the examples, the two or more BPAC BSSs may include at least one single BPAC BSS having two or more PCP/APs serving within the single BPAC BSS, the two or more PCP/APs serving within the single BPAC BSS being represented by the respective single virtual PCP/AP to the single BPAC BSS.

In some example aspects, the present disclosure describes a method for managing wireless communications, the method including: transmitting synchronization signals to one or more electronic devices (EDs) of one BSS PCP/AP cluster (BPAC) basic service set (BSS) and to one or more personal basic service set (PBSS) control points (PCPs)/ access points (APs) serving in the one BPAC BSS, to synchronize transmissions within the one BPAC BSS.

In any of the examples, the synchronization signals may be transmitted via a synchronization layer at least partially implemented in a media access control (MAC) layer, and synchronization signals within the one BPAC BSS may be transmitted via the synchronization layer.

In any of the examples, the method may further include: transmitting synchronization signals to respective PCP/APs of two or more BPAC BSSs to synchronize transmissions between the two or more BPAC BSSs.

In any of the examples, the method may be performed by an inter BPAC BSS PCP/AP that operates within each of the two or more BPAC BSSs.

In any of the examples, each BPAC BSS may be represented as a respective single virtual PCP/AP, and the synchronization signals may be transmitted to synchronize the two or more BPAC BSSs across the virtual PCP/APs.

In any of the examples, the method may further include: relaying communications between the two or more BPAC BSSs.

In any of the examples, there may be two or more PCP/APs serving within the one BPAC BSS, the two or more PCP/APs serving within the one BPAC BSS being represented by a single virtual PCP/AP.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The next generation of the IEEE 802.11ad/ay standard (commonly referred to using the shorthand 802.11ad/ay) requires a new reference architecture to enable new business models and usage models to build upon and support all desired functions. In various examples, the present disclosure provides a BSS PCP/AP cluster (BPAC) reference architecture to provide a collaborative service set among PCP/APs for single or multiple stations (STAs) (e.g., DMG or enhanced DMG (EDMG) STAs). The BPAC service set may provide services with higher throughput and lower latency, with consideration of mobility. In various examples, the present disclosure provides a BPAC protocol that provides a self organized collaborative clustering service set, which may provide efficient spatial reuse, synchronization service and interference management. In various examples, the present disclosure also builds on this BPAC BSS architecture by providing a synchronization cross-layer to enable synchronization of at least one BPAC BSS.

Figure 1:
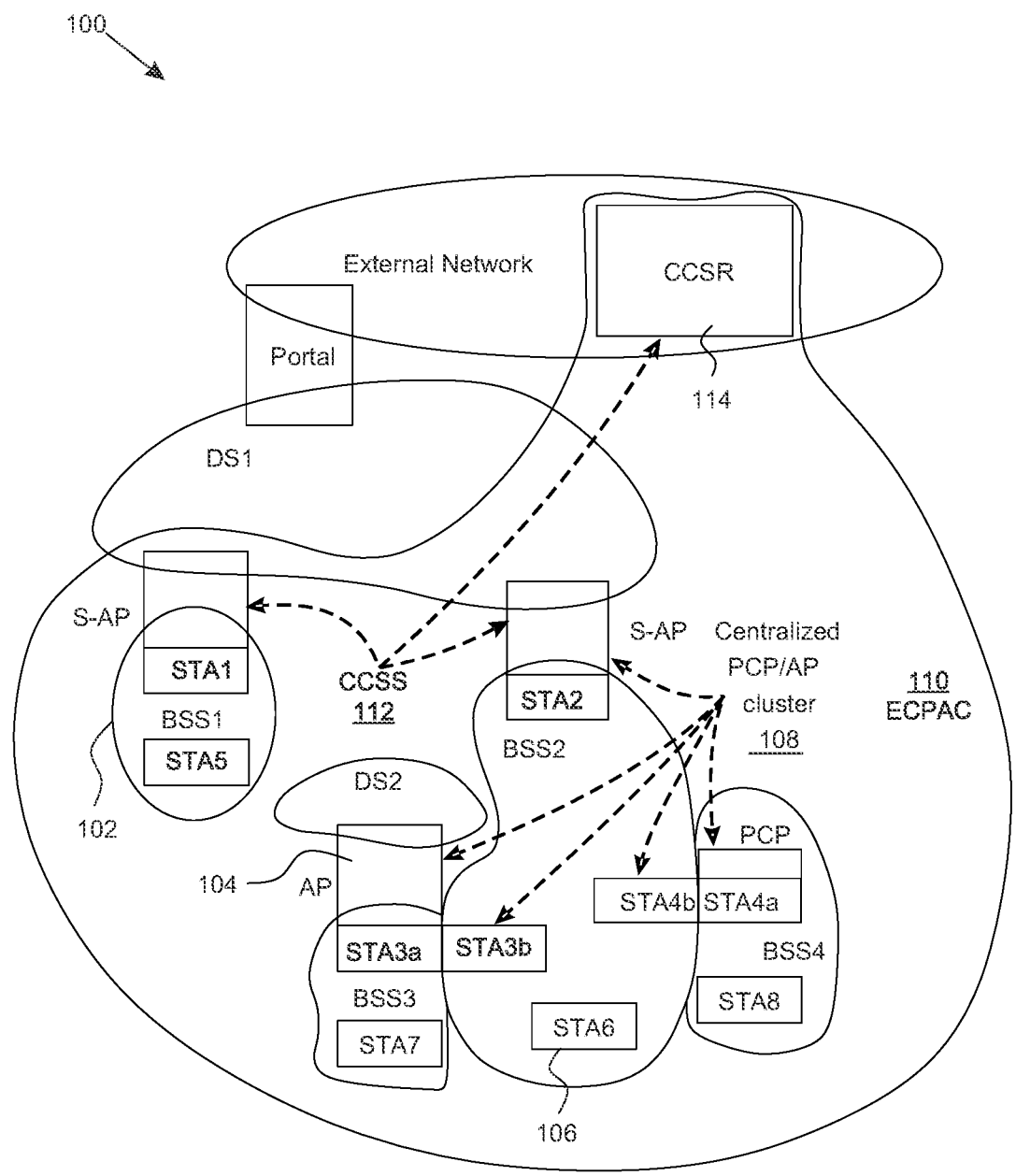
FIG. 1 illustrates a system using the reference architecture and components as defined in IEEE 802.11ad.

FIG. 1 illustrates an example system 100 using the legacy reference architecture as defined in the IEEE 802.11ad standard. To avoid clutter, only one instance of each component is labeled in FIG. 1. In the system 100, multiple BSSs 102 are shown. Each BSS 102 includes one PCP/AP 104 managing at least one STA 106. Operation of a DMG BSS 102 is in accordance with sub-clause 4.3.1 of 802.11ad, in particular sub-clause 4.3.17 for a DMG STA and sub-clause 4.3.18 for a DMG relay. Operation of a PCP/AP 104 is in accordance with sub-clause 4.3.2a of 802.11ad (which defines operation of a PBSS). As shown in FIG. 1, multiple BSSs 102 may be clustered together in a PCP/AP cluster 108. An extended centralized PCP/AP cluster (ECPAC) 110 is another form of PCP/AP cluster 108, and excludes the external network and distribution systems (DSs). A centralized coordination service set (CCSS) 112 serves to coordinate multiple PCP/APs 104 of a PCP/AP cluster 108, 110, via a centralized coordination service root (CCSR) 114. Operation of the CCSS 112 and ECPAC 110 is in accordance with sub-clause 4.3.4.4 of 802.11ad. In the system 100, there is only one PCP/AP 104 for each BSS 102. For example, although STA3 functions as a PCP/AP 104 in BSS3, it operates only as a STA 106 in BSS2. This is denoted by the differentiation between STA3a and STA3b as shown.

In the present disclosure, the terms PCP and AP may be used interchangeably, and generally the term PCP/AP may be used. The PCP/AP 104 may also be referred to as a base station. The PCP/AP 104 may be implemented as a router, for example. The STAs 106 may also be referred to as terminals, user devices, user equipment (UE) or clients, for example. Each STA 106 may be any suitable electronic device (ED), including any device capable of wireless communication, for example mobile or stationary devices such as smartphones, laptops, mobile phones or tablet devices, for example, and the STAs 106 need not be the same as each other.

Figure 2:
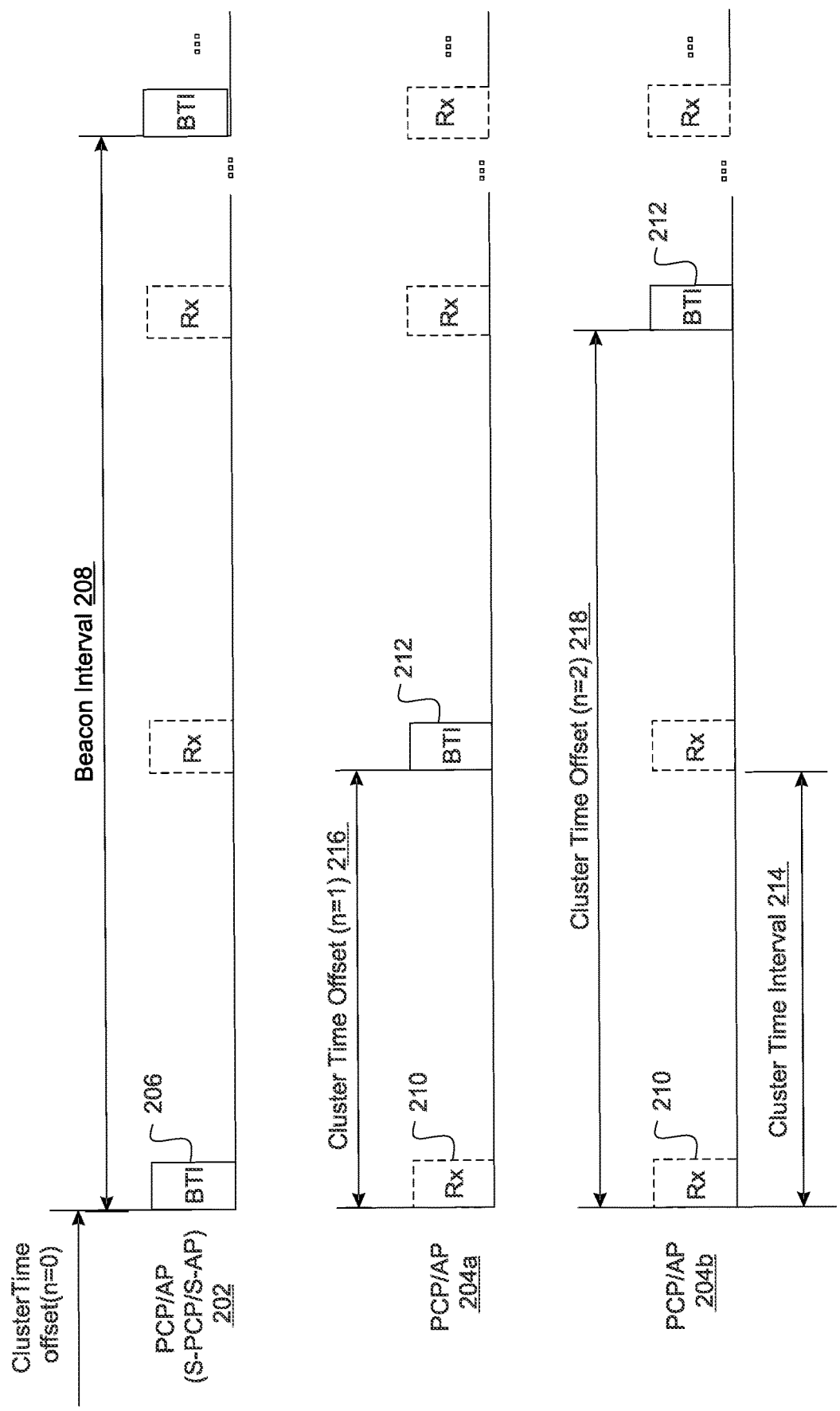
FIG. 2 is a timing diagram illustrating PCP/AP clustering management in a BSS, as defined in IEEE 802.11ad.

FIG. 2 is a timing diagram illustrating an example of PCP/AP cluster management, as defined in the IEEE 802.11ad standard. PCP/AP clustering is used to improve spatial sharing and interference mitigation with other co-channel BSSs. In this example, three PCP/APs are shown. Clustering of the PCP/APs enables alignment of the beacon intervals (BIs) of the respective BSSs. The clustered PCP/APs may then communicate their respective scheduling information with each other and coordinate scheduling of their respective transmissions accordingly.

In the example of FIG. 2, a first PCP/AP serves as the synchronization PCP/AP (S-PCP/AP) 202, which transmits a synchronization beacon. The S-PCP/AP 202 provides synchronization (among other services) to receiving PCP/APs of a PCP/AP cluster. The S-PCP/AP 202 transmits a synchronization beacon 206 during a beacon interval 208. Receiving PCP/APs 204a, 204b (generally, receiving PCP/AP 204) receives the beacon 206 during a receiving interval Rx 210. Here, the receiving PCP/APs 204 may be functioning in STA mode, such that they respond to the S-PCP/AP 202 similarly to how a STA would response to a PCP/AP. Each receiving PCP/AP 204 may transmit its respective DMG beacon 212 during one of the successive beacon SPs, after a respective predetermined time interval. The predetermined time interval may be defined as the number of cluster time intervals 214 that the receiving PCP/AP 204 must wait until it can transmit its beacon 212. For example, one receiving PCP/AP 204*a* may have a cluster time offset of one cluster time interval (n=1) 216. Another receiving PCP/AP 204*b* may have a cluster time offset of two cluster time intervals (n=2) 218, or any other suitable cluster time offset.

Figure 3:
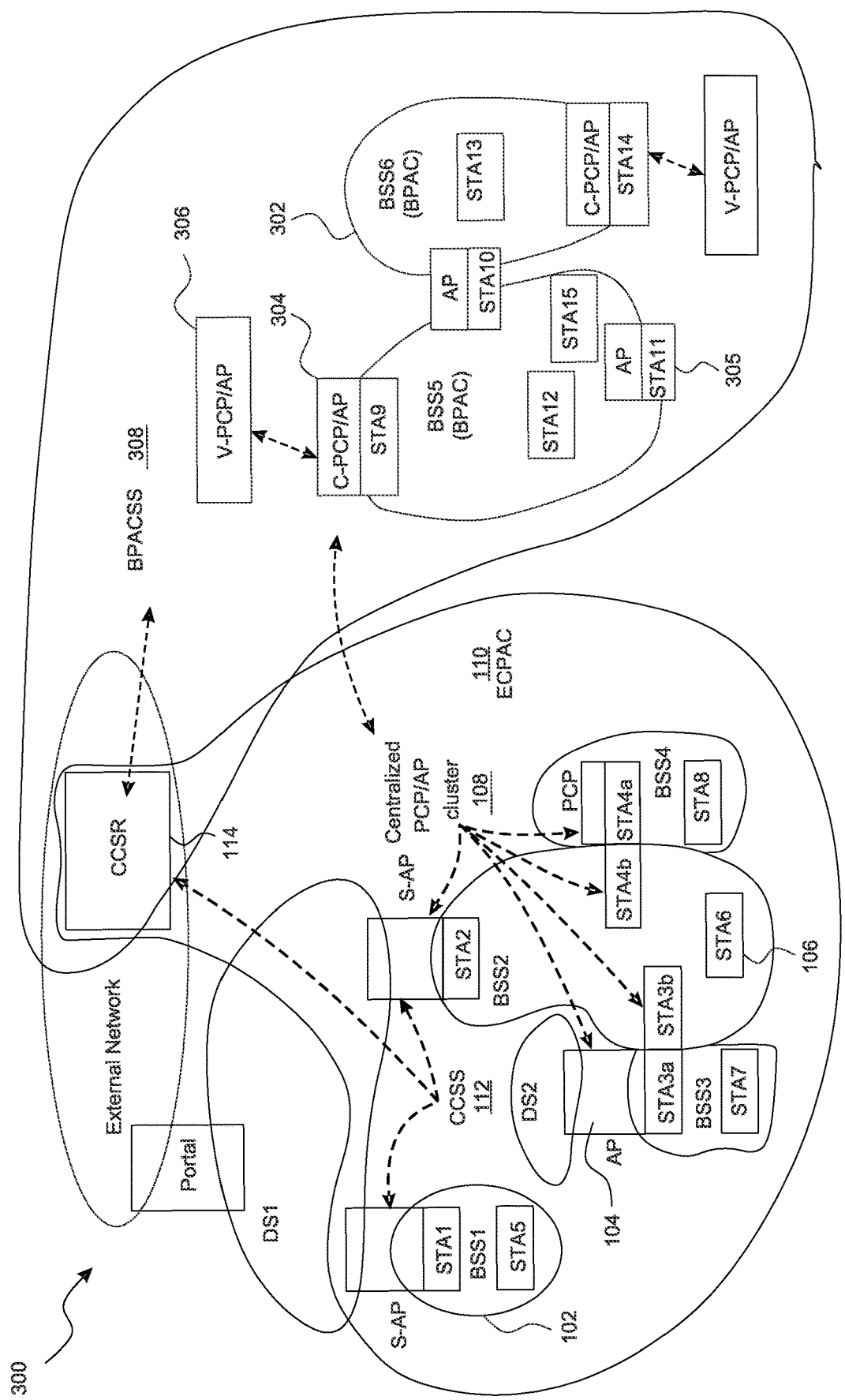
FIG. 3 illustrates a system using the disclosed reference architecture with a BPAC BSS.

FIG. 3 illustrates an example system 300 in which the disclosed reference architecture is used. The system 300 includes the components of the legacy system 100 in FIG. 1. Additionally, the system 300 includes another type of BSS, referred to herein as BSS PCP/AP cluster (BPAC) BSS 302. In a BPAC BSS 302, there may be multiple PCP/APs.

One PCP/AP 104 in a BPAC BSS 302 may serve as a coordinator PCP/AP (C-PCP/AP) 304. All PCP/APs within the BPAC BSS 302, except for the C-PCP/AP 304, are member PCP/APs 305 within the BPAC BSS 302 and are managed by the C-PCP/AP 304. The C-PCP/AP 304 establishes and maintains operations within the BPAC BSS 302, and provides services including coordination, synchronization and scheduling for all member PCP/APs 305 of the BPAC BSS 302. The C-PCP/AP 304 may also coordinate the services provided by the member PCP/APs 305, so as to provide a STA 106 with a requested set of services. Conceptually, the C-PCP/AP 304 may play a role similar to an S-PCP/AP in a legacy PCP/AP cluster. However, whereas the legacy S-PCP/AP serves to coordinate among PCP/APs 104 of different BSSs 102, the C-PCP/AP 304 serves to coordinate among member PCP/APs 305 within a single BPAC BSS 302, which in some examples may include multiple BSSs 102 with BPAC functions. The C-PCP/AP 304 may also serve to establish and manage formation and operations of the BPAC BSS 302, including managing addition or removal of member PCP/APs 305.

The PCP/APs 304, 305 within a given BPAC BSS 302 may use spatial reuse techniques to share a channel within the BPAC BSS 302. Multiple PCP/APs 304, 305 within a BPAC BSS 302 may thus provide services to one or more STAs 106 in the BPAC BSS 302 simultaneously. For example, BSS5 is a BPAC BSS 302 with three PCP/APs 304, 305 (namely STA9, STA10 and STA11) providing services to two STAs 106 (namely STA12 and STA15). This may enable the STAs 106 to experience a higher throughput and/or lower latency. A given PCP/AP 304, 305 may also participate in multiple BPAC BSSs 302 simultaneously. For example, the PCP/AP STA10 may provide services to both BSS5 and BSS6.

A virtual PCP/AP (V-PCP/AP) 306 may be implemented for each BPAC BSS 302. The V-PCP/AP 306 is a virtual representation of all the PCP/APs 304, 305 in the BPAC BSS 302. By representing the BPAC BSS 302 as a single V-PCP/AP 306 (rather than multiple individual PCP/APs), the V-PCP/AP 306 simplifies and streamlines operations relating to the BPAC BSS 302, such as discovery, synchronization, association, authentication and quality of service (QoS)/quality of experience (QoE) traffic scheduling. For example, the V-PCP/AP 306 may enable all PCP/APs 304, 305 of the BPAC BSS 302 to be discovered and identified by a STA 106 (e.g., as a single BSSID). The STA 106 may move between coverage of the PCP/APs 304, 305 within a single BPAC BSS 302 without having to re-authenticate with each PCP/AP 304, 305. Thus, the STA 106 may experience the BPAC BSS 302 as a single PCP/AP (e.g., similar to the experience in a legacy BSS 102).

The V-PCP/AP 306 is managed by the C-PCP/AP 304. However, the V-PCP/AP 306 may reside in one or more PCP/APs 304, 305 of the BPAC BSS 302. The C-PCP/AP 304 may use the V-PCP/AP 306 to coordinate operation of the PCP/APs 304, 305 in a BPAC BSS 302. For example, the V-PCP/AP 306 may be used to coordinate beam coverage functions, such as coordination of beamforming and beam tracking of individual PCP/APs 304, 305 to maintain coverage of a STA 106 as the STA 106 moves within coverage of the BPAC BSS 302. Coordination of beams may also be used to increase throughput to the STA 106, for example by directing additional PCP/APs 304, 305 to direct beams to the STA 106.

A BPAC service set (BPACSS) layer 308 may be implemented to enable management of a BPAC BSS 302 by the legacy CCSS 112 via the CCSR 114 (using clustering controls in accordance with 801.11ad/ay). The BPACSS layer 308 functions as a super set of BSSs 102. This means that the BPACSS layer 308 inherits all the operations and services of a BSS 102. Thus, from the perspective of the CCSS 112, the BPACSS layer 308 enables the BPAC BSS 302 to appear to be equivalent to a legacy BSS 302. In this way, the BPACSS layer 308 may enable the BPAC BSSs 302 to be backwards compatible with the legacy network, via the CCSR 114.

In FIG. 3, BPAC BSS5 and BPAC BSS6 are adjacent BPAC BSSs 302, and share an inter BPAC BSS AP (namely STA10). Inter-BSS interference between BPAC BSS5 and BPAC BSS6 is likely to occur, even if beam tracking and beamforming are used to reduce interference. Such interference would be even greater if the coverage areas of BPAC BSS5 and BPAC BSS6 were totally or partially collocated (that is, overlapping in beam coverage). In fact, overlapping of coverage areas by different BPAC BSSs 302 may be expected, such as in a high density network (e.g., in an urban environment) and may be desirable (e.g., to ensure the STA 106 is provided with seamless transition between coverage areas). However, the inter-BSS interference that arises from such overlapping coverage may reduce the throughput of each BPAC BSS 302. A synchronization cross-layer, described further below, may be used to synchronize across multiple BPAC BSSs 302, to address such issues.

Figure 4:
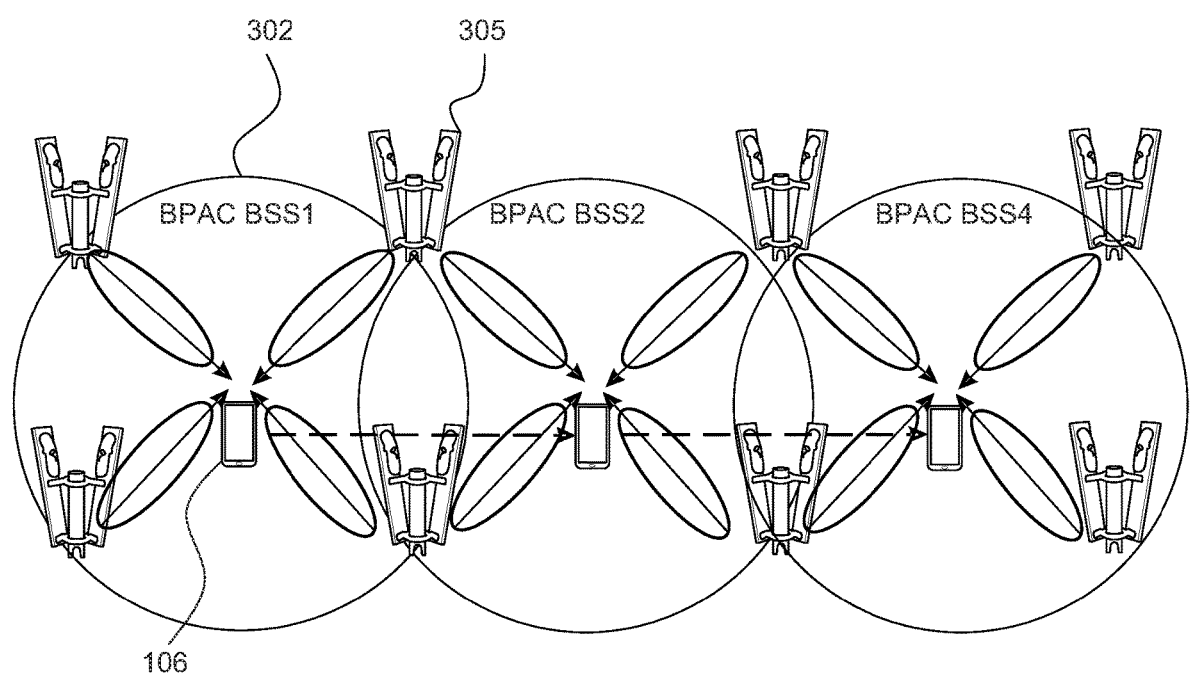
FIG. 4 illustrates an example use of BPAC BSS in a high density application.

FIG. 4 illustrates an example of how the mobility of a STA 106 may be accommodated by a BPAC BSS 302. FIG. 4 shows a high density network, which may be suitable for use as an urban hotspot. In FIG. 4, there are three BPAC BSSs 302, namely BPAC BSS1, BPAC BSS2 and BPAC BSS3, which are adjacent to each other. In this example, each BPAC BSS 302 is shown to have four PCP/APs 305, with some PCP/APs 305 serving more than one BPAC BSS 302. One PCP/AP 305 in each BPAC BSS 302 serves as the C-PCP/AP, but this is not indicated for simplicity.

Within each BPAC BSS 302, the STA 106 is served by multiple PCP/APs 304, 305. Service by multiple PCP/APs 304, 305 at the same time may provide the STA 106 with enhanced service (e.g., larger throughput, lower latency). As the STA 106 moves across different BPAC BSSs 302 (indicated by dotted arrows), the C-PCP/APs 304 of the BPAC BSSs 302 manage beam tracking (indicated by solid arrows) by individual PCP/APs 304, 305, thus maintaining consistent level of service despite mobility of the STA 106.

Figure 5:
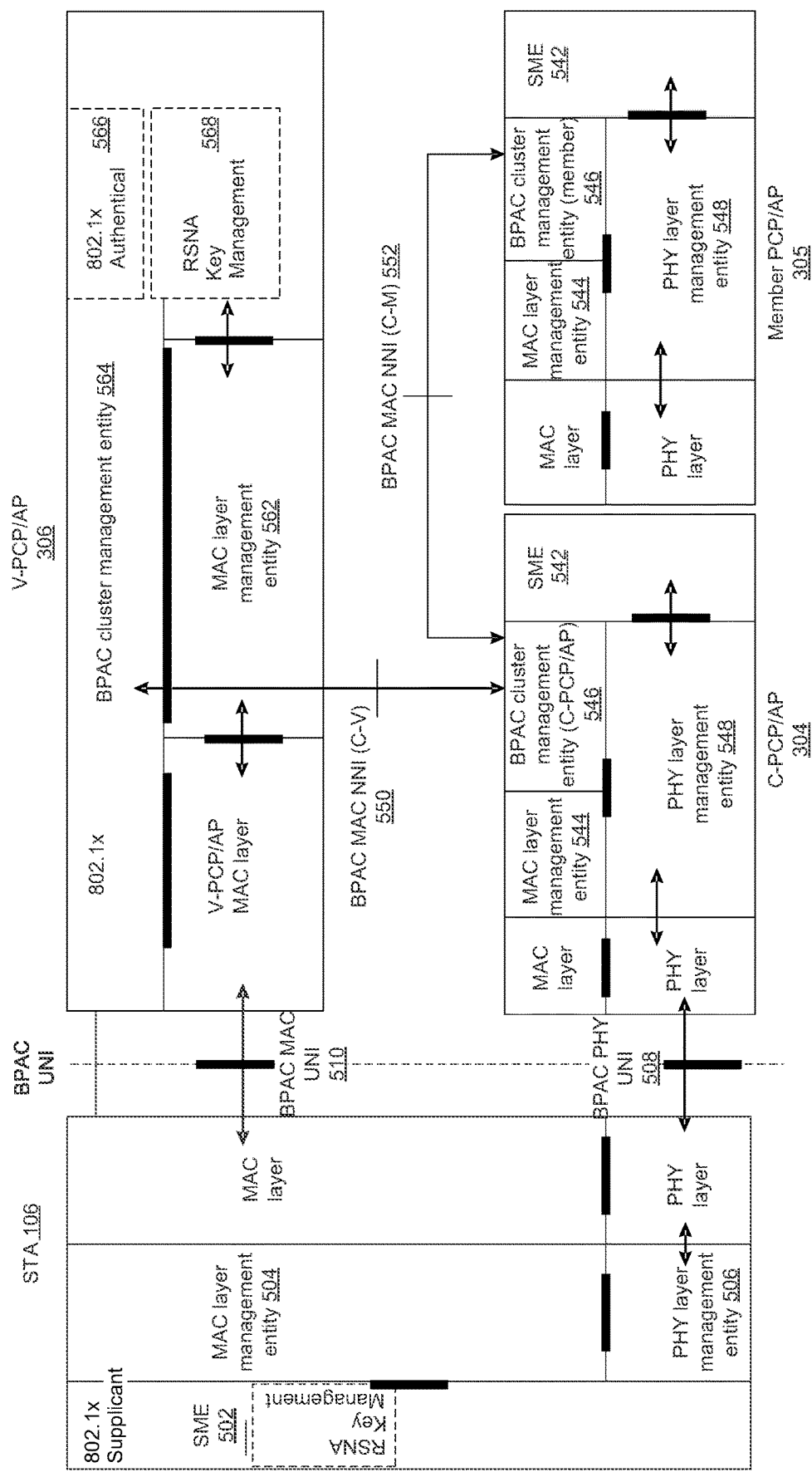
FIG. 5 illustrates an example of the disclosed BPAC BSS reference model.

FIG. 5 illustrates the disclosed reference model for implementing the BPAC BSS described with respect to FIG. 3. The STA 106 (only one is shown for simplicity) communicates with the PCP/APs 304, 305 of the BPAC BSS via a BPAC user-network interface (UNI). In FIG. 5, the STA 106 is simplified to show only the media access control (MAC) layer and the physical layer (PHY layer), however the STA 106 may include additional components, as discussed further below. In FIG. 5, the STA 106 is shown to include a system management entity (SME) 502, a MAC layer management entity 504 (residing in the MAC layer) and a PHY layer management entity 506 (residing in the PHY layer). The model of the STA 106 shown in FIG. 5 may be similar to legacy STA models.

The physical link to the BPAC BSS occurs over the PHY layer, via the BPAC PHY UNI 508. The C-PCP/AP 304 handles communications through the physical channel, using the PHY layer. The data link to the BPAC BSS occurs over the MAC layer, via the BPAC MAC UNI 510. Authentication of the STA 106 to the BPAC BSS may be carried out using suitable techniques (e.g., during initial association of the STA 106 with the V-PCP/AP 306 of the BPAC BSS), such as robust security network association (RSNA) key management by the SME 502 of the STA 106.

Each PCP/AP 304, 305 is simplified to show only the MAC layer and the PHY layer, however the PCP/AP 304, 305 may include additional components, as discussed further below. Although the C-PCP/AP 304 and the member PCP/AP 305 (only one is shown for simplicity) may carry out different functions, they may be similar to or identical to each other. The C-PCP/AP 304 may include an SME 542, a MAC layer management entity (MLME) 544 (residing in the MAC layer), a BPAC cluster management entity 546 (residing in the MAC layer) and a PHY layer management entity (PLME) 548 (residing in the PHY layer). The member PCP/AP 305 may have similar components. However, the BPAC cluster management entity 546 in the C-PCP/AP 304 may operate in C-PCP/AP mode, whereas the BPAC cluster management entity 546 in the member PCP/AP 305 may operate in member mode. It should be noted that because the C-PCP/AP 304 and the member PCP/AP 305 are similar, the role of the C-PCP/AP 304 may be carried out by any member PCP/AP 305 (e.g., in the event the C-PCP/AP 304 becomes unavailable) and/or different PCP/APs 305 in the BPAC BSS may act as the C-PCP/AP 304 at different times. Various service access points (SAPs) between the MAC layer and PHY layer are represented in FIG. 5 as black rectangles. Any suitable SAP may be used, depending on the services requested, such as MLME-PLME SAP, PLME SAP, MLME SAP, PHY SAP or MAC SAP, among others.

The V-PCP/AP 306 is a layer that represents all PCP/APs 304, 305 of the BPAC BSS. The V-PCP/AP 306 may also be considered as an entity providing MAC functions and services aggregated over all PCP/APs 304, 305. The V-PCP/AP 306 is a virtual entity that resides only in the MAC layer. The V-PCP AP 306 may include a MAC layer management entity 562 and a BPAC clustering management entity 564, similar to that of the physical PCP/APs 304, 305. All security and authentication of the BPAC BSS is managed by the V-PCP/AP 306. For example, an 802.1x authenticator 566 and an RSNA key management 568 may be implemented by the V-PCP/AP 306. Because all security and authentication is managed by the V-PCP/AP 306, rather than individual PCP/APs 304, 305, once the STA 106 is associated with the BPAC BSS and authenticated by the V-PCP/AP 306, the STA 106 does not need to re-authenticate with individual PCP/APs 304, 305 when the STA 106 adds or changes data links among the PCP/APs 304, 305 of the BPAC BSS. The V-PCP/AP 306 may thus be used to perform various PCP/AP functions with the STA 106, such as association and security functions, among others.

The C-PCP/AP 304 communicates with the V-PCP/AP 306 and the member PCP/APs 305 via a BPAC network-network interface (NNI) over the MAC layer. FIG. 5 illustrates two types of BPAC MAC NNI, namely a coordinator-virtual (C-V) interface (BPAC MAC NNI (C-V) 550) between the C-PCP/AP 304 and the V-PCP/AP 306, and a coordinator-member (C-M) interface (BPAC MAC NNI (C-M) 552) between the C-PCP/AP 304 and each member PCP/AP 305. Communications between the C-PCP/AP 304 and the V-PCP/AP 306 and each member PCP/APs 305 is via the respective BPAC clustering management entities 546, 564.

Utilizing clustering functions (enabled by the BPAC cluster management entity 546, 564), multiple PCP/APs 304, 305 may thus be represented as a single V-PCP/AP 306 to serve one or more STAs 106 in a BPAC BSS. This may enable the STAs 106 within a BPAC BSS to be provided with larger throughput with spatial sharing, larger coverage, seamless mobility services, and better interference management. The V-PCP/AP 306 may reside in the C-PCP/AP 304 of the BPAC BSS, for example, or the V-PCP/AP 306 may reside in more than one PCP/AP 304, 305 (e.g., may reside in one or more member PCP/APs 305 and also in the C-PCP/AP 304). If the V-PCP/AP 306 resides entirely in the C-PCP/AP 304, then the functions of the V-PCP/AP 306 are provided by the C-PCP/AP 304. If the V-PCP/AP 306 resides across multiple PCP/APs 304, 305, then the functions of the V-PCP/AP 306 may be distributed among those PCP/APs 304, 305. As discussed above, the C-PCP/AP 304 may be responsible for managing the V-PCP/AP 306, and may instruct one or more member PCP/APs 305 to provide one or more functions of the V-PCP/AP 306.

The STA 106 communicates with a V-PCP/AP 306 (e.g., using a single virtual BSSID), via the BPAC MAC UNI 510, for channel access (e.g., scheduling). A single SME 502 may also be used for managing security over multiple bands/channels, thus simplifying security management and enabling single authentication (rather than requiring the STA 106 to be separately authenticated with each PCP/AP 304, 305 in the BPAC BSS). The BPAC MAC UNI 510 also facilitates mobility and tracking, facilitates spatial reuse requirements (e.g., STA grouping), facilitates interference management requirements, and facilitates user QoS/QoE requirements.

Using the BPAC MAC NNI 550, 552, BPAC clustering formation (e.g., PCP/AP clustering and contention avoiding) may be carried out, as well as maintenance operations for the BPAC. The BPAC MAC NNI 550, 552 also enables management of STA mobility, beamforming and beam tracking. Traffic load balancing and routing may be carried out using the BPAC MAC NNI 550, 552. As well, security and authentication may be consolidated in the V-PCP/AP 306, as described above.

Figure 6:
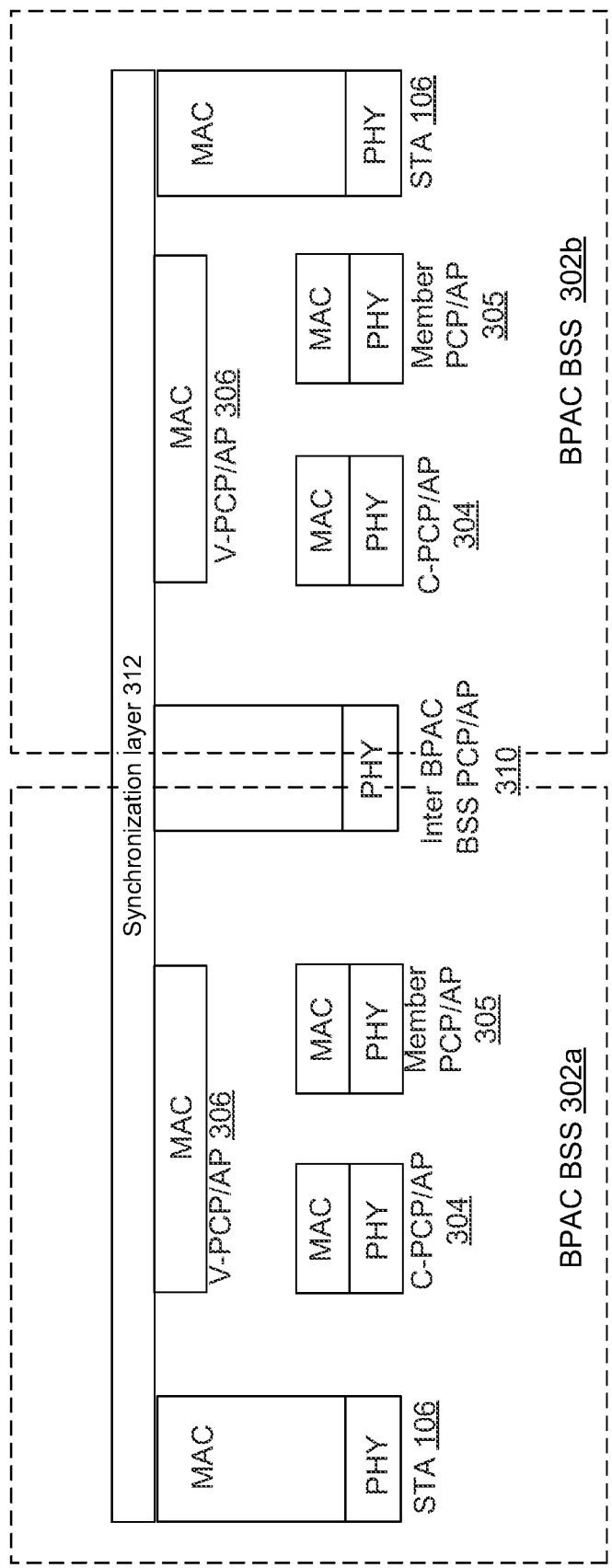
FIG. 6 illustrates an example of the disclosed BPAC BSS reference model for implementing a synchronization layer.

FIG. 6 illustrates the reference model for implementing the synchronization layer 312 (which may also be referred to as a synchronization MAC layer, a synchronization abstract layer or a synchronization abstract MAC layer). Whereas FIG. 5 illustrates a reference model for a single BPAC BSS 302, FIG. 6 illustrates a reference model for synchronizing two or more BPAC BSSs 302. Thus, it should be understood that the reference model shown in FIG. 6 may be implemented together with the reference model shown in FIG. 5. Two overlapping BPAC BSSs, namely BPAC BSS 302a and BPAC BSS 302b, are shown, with one inter BPAC BSS PCP/AP 310 between the two BPAC BSSs 302a, 302b. The inter BPAC BSS PCP/AP 310 may provide bridging functions between the two BPAC BSSs 302a, 302b, for example relaying synchronization signals (described below) or association messages between the BPAC BSSs 302a, 302b. Because the inter BPAC BSS PCP/AP 310 may be managed by the V-PCP/APs 306 of both BPAC BSSs 302a, 302b, information managed by the V-PCP/AP of one BPAC BSS 302a may be shared with the V-PCP/AP of the other BPAC BSS 302b, via the inter BPAC BSS PCP/AP 310. However, there may be more than one inter BPAC BSS PCP/AP 310 that services both BPAC BSSs 302a, 302b. Further, the coverage area of a given BPAC BSS 302 may overlap with the coverage area of more than one other BPAC BSS 302. In FIG. 6, only one STA 106 is shown for each BPAC BSS 302a, 302b for simplicity. Similarly, only one member PCP/AP 305 is shown for each BPAC BSS 302a, 302b for simplicity. In some examples, the inter BPAC BSS PCP/AP 310 may function as the C-PCP/AP 304 of one or more BPAC BSS 302a, 302b. Generally, the C-PCP/AP 304, member PCP/AP 305 and inter BPAC BSS PCP/AP 310 may be similar to or identical to each other, but may serve different roles depending on the specific functions they provide. The functions and roles of these PCP/APs 304, 305, 310 may change over time.

In FIG. 6, only the PHY layer and the MAC layer are shown, however the STA 106 and the PCP/APs 304, 305 may include additional components, as discussed further below. BPAC BSS 302a will be described in detail below. BPAC BSS 302b in this example is similar to BPAC BSS 302a and will not be described in detail.

The STA 106 physically links to BPAC BSS 302a over the PHY layer, via a BPAC PHY UNI (not shown in FIG. 6). The C-PCP/AP 304 of BPAC BSS 302a handles communication through the physical channel, using the PHY layer. The data link from the STA 106 to BPAC BSS 302a occurs over the MAC layer, via the BPAC MAC UNI (not shown in FIG. 6).

The synchronization layer 312 covers both BPAC BSS 302a and BPAC BSS 302b, including the PCP/APs 304, 305 and STAs 106 of each BPAC BSS 302a, 302b, as well as the inter BPAC BSS PCP/AP 310. The synchronization layer 312 resides in the MAC layer and provides synchronization of the PCP/APs 304, 305 and STAs 106 of the two BPAC BSSs 302a, 302b, to enable maximization of throughput in the BPAC BSSs 302a, 302b. Such cross-BSS synchronization is not found in the legacy architecture. In some examples, the synchronization layer 312 described herein may be provided as an additional MAC sublayer over legacy synchronization processes.

The V-PCP/APs 306 of each BPAC BSS 302a, 302b may communicate with each other over the synchronization layer 312, for example using the precision time protocol such as that defined in IEEE 1588. Transmission of a synchronization signal (e.g., from an internal or external synchronization clock source) may be done using the example fine timing measurement (FTM) protocol. The inter BPAC BSS PCP/AP 310 may serve as a portal or relay to transmit synchronization signals between the BPAC BSSs 302a, 302b. The inter BPAC BSS PCP/AP 310 may provide relaying functions to relay communications between the V-PCP/APs 306 of each BPAC BSS 302a, 302b, over the synchronization layer 312. In some examples, any PCP/AP 304, 305 within the BPAC BSS 302a, 302b may provide the synchronization service (e.g., by providing its own clock source as the synchronization signal). Thus, synchronization between the BPAC BSSs 302a, 302b may be performed outside of the functions implemented by the V-PCP/APs 306.

Synchronization of the BPAC BSSs 302a, 302b may facilitate spatial reuse among coverage-overlapping BPAC BSSs (that is, BPAC BSSs whose coverage areas overlap with each other) and more efficient interference management among coverage-overlapping BPAC BSSs. Synchronization may also enable improved or optimized throughput to be achieved for both downlink and uplink communication among coverage-overlapping BPAC BSSs.

Figure 7:
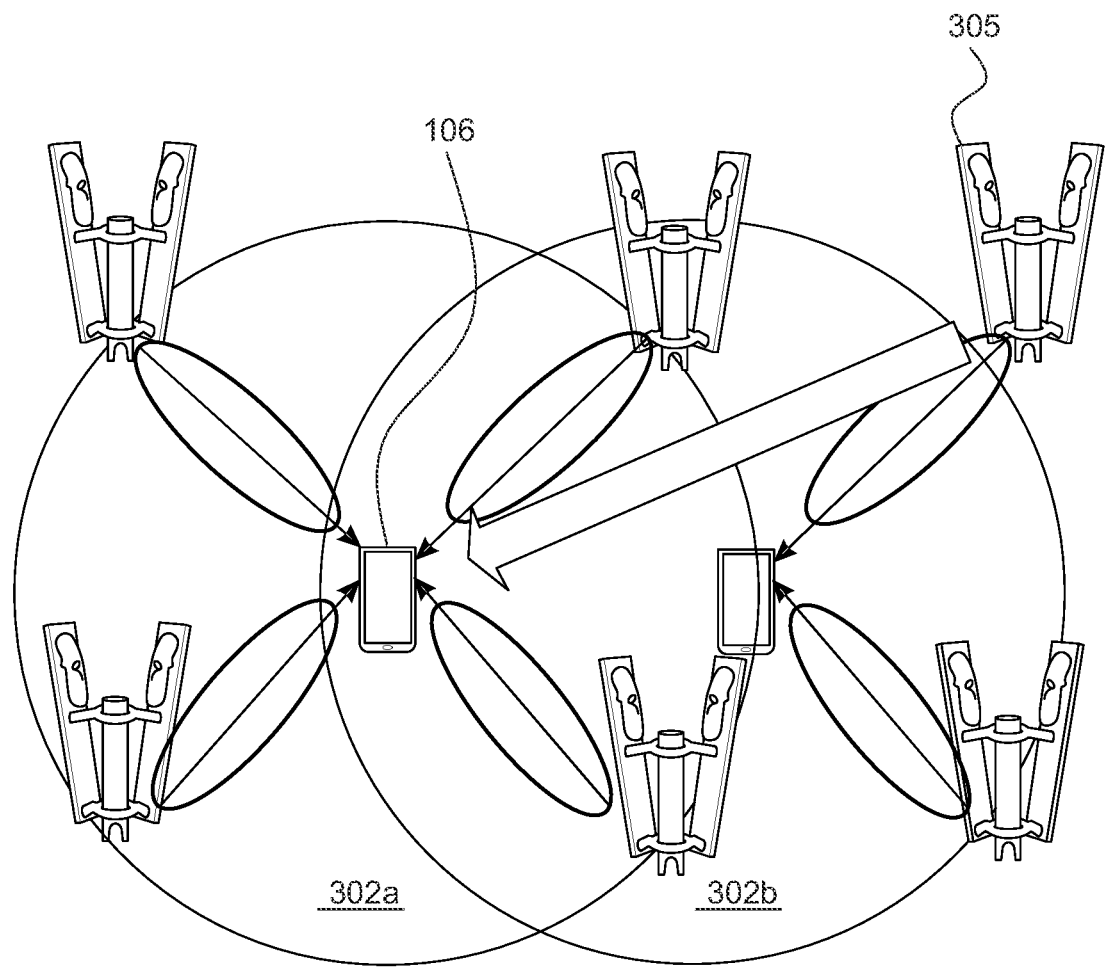
FIG. 7 illustrates an example use of synchronized BPAC BSS.

FIG. 7 illustrates an example in which synchronization may be used in a high density network, such as an urban WiFi hotspot. Here, two BPAC BSSs 302a, 302b are partially collocated. In other examples, the BPAC BSSs 302a, 302b may be totally collocated (e.g., one BPAC BSS may encompass another BPAC BSS), or may be adjacent to each other. Because of collocation, a STA 106 in one BPAC BSS 302a may experience interference (indicated by white arrow) from transmissions in the other BPAC BSS 302b.

Without synchronization, the throughput of the coverage-overlapping BPAC BSSs 302a, 302b is constrained by interference (including both intra-BSS interference as well as inter-BSS interference). With synchronization between the BPAC BSSs 302a, 302b, the downlink and uplink transmissions of the BPAC BSSs 302a, 302b are synchronized, enabling maximization of throughput.

Figure 8A:
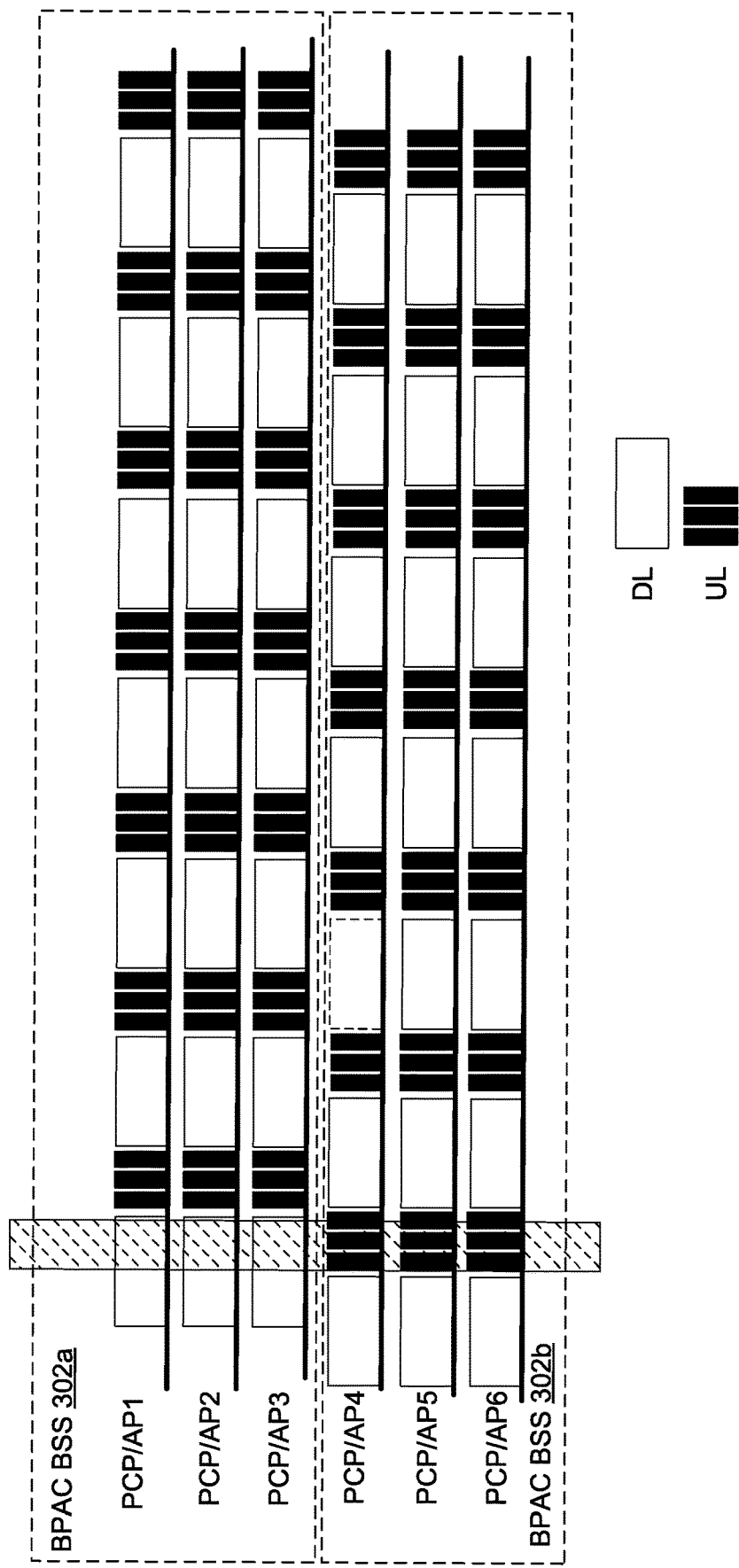
FIGS. 8A and 8B are timing diagrams comparing unsynchronized and synchronized BPAC BSSs.
Figure 8B:
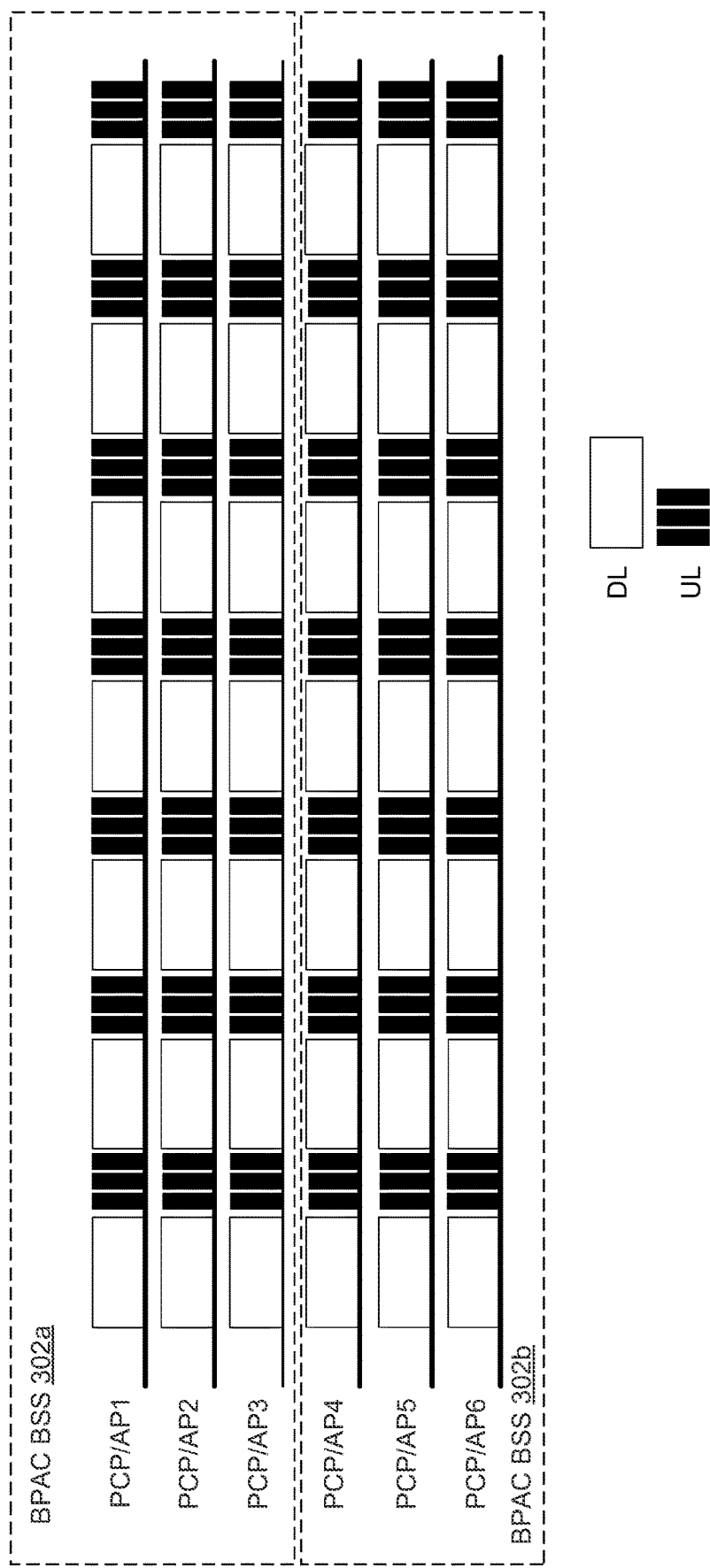

FIGS. 8A and 8B are timing diagrams illustrating how synchronization of coverage-overlapping BPAC BSSs, for example as described herein, may enable maximization of throughput in the coverage-overlapping BPAC BSSs. BPAC BSS 302a and BPAC BSS 302b are coverage-overlapping BPAC BSSs (e.g., as shown in FIG. 6). In FIGS. 8A and 8B, three PCP/APs are shown for each BPAC BSS 302a, 302b, for simplicity (the C-PCP/AP is not indicated). Downlink (DL) and uplink (UL) transmissions among the PCP/APs within a single BPAC BSS 302a or 302b are synchronized (e.g., synchronized by the C-PCP/AP), thus DL and UL interference within a single BPAC BSS 302a or 302b is mitigated.

However, as seen in FIG. 8A, where the coverage-overlapping BPAC BSSs 302a, 302b are not synchronized, the DL and UL transmissions between BPAC BSS 302a and BPAC BSS 302b may interfere with each other. For example, as indicated by the hatched area, the scheduled DL period of BPAC BSS 302a overlaps with the scheduled UL period of BPAC BSS 302b with the result that this period of time cannot be used by either BPAC BSS 302a or BPAC BSS 302b without risk of interference (and hence degradation of QoS/QoE for the STAs of each BPAC BSS). This results in a reduction of throughput.

FIG. 8B illustrates the result of synchronization of the coverage-overlapping BPAC BSSs 302a, 302b, using the synchronization layer described above. As shown in FIG. 8B, after synchronization, the DL and UL timing of BPAC BSS 302a and BPAC BSS 302b are synchronized (e.g., using synchronization signals provided by the synchronization layer). That is, the scheduled DL and UL periods are concurrent for both BPAC BSS 302a and BPAC BSS 302b. DL and UL transmissions from each BPAC BSS 302a, 302b thus do not suffer from inter-BSS interference, and throughput may be improved.

Although illustrated using the example of two BPAC BSSs, the synchronization layer 312 may also facilitate synchronization within a single BPAC BSS 302. The synchronization layer 312 may be implemented as a layer over the V-PCP/AP 306 of a single BPAC BSS 302, and the V-PCP/AP 306 (or any PCP/AP 304, 305 in the BPAC BSS 302) may use the synchronization layer 312 to communicate synchronization signals to all the EDs 106 and PCP/APs 304, 305 of the BPAC BSS 302. Thus, all the PCP/APs 304, 305 and EDs 106 will be synchronized and scheduled for DL and UL transmissions, thus mitigating intra-cell interference.

The synchronization layer 312 and the V-PCP/AP 306 may be implemented by the same PCP/AP (e.g., the C-PCP/

AP 304). Where the synchronization layer 312 is provided over two or more BPAC BSSs 302, the synchronization layer 312 may be implemented by an inter BPAC BSS PCP/AP 310 that also serves at the C-PCP/AP 304 for at least one BPAC BSS 302 (and may be a C-PCP/AP 304 or a member PCP/AP 305 for the other BPAC BSS 302). Thus, in some examples, one PCP/AP may provide the synchronization layer 312 and the V-PCP/APs 306 for all coverage-overlapping BPAC BSSs 302. In other examples, the synchronization layer 312 and the V-PCP/AP 306 in one or more coverage-overlapping BPAC BSSs 302 may be provided by separate entities.

Figure 9:
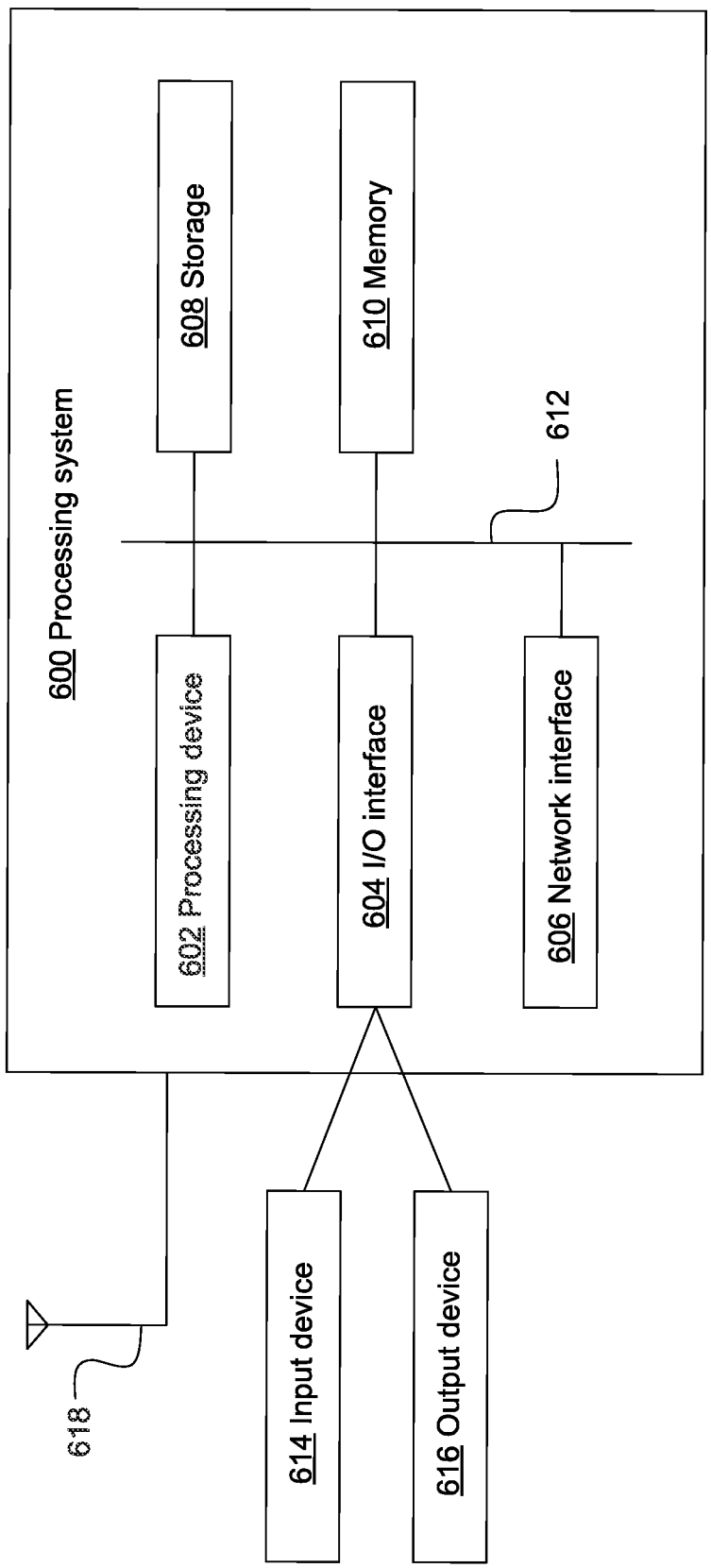
FIG. 9 is a block diagram of an example simplified processing system, which may be used to implement embodiments disclosed herein.

FIG. 9 is a block diagram of an example simplified processing system 600, which may be used to implement embodiments disclosed herein, and provides a higher level implementation example. The STA 160, C-PCP/AP 304 and/or member PCP/AP 305 may be implemented using the example processing system 600, or variations of the processing system 600. The processing system 600 could be a server or a mobile device, for example, or any suitable processing system. Other processing systems suitable for implementing embodiments described in the present disclosure may be used, which may include components different from those discussed below. Although FIG. 9 shows a single instance of each component, there may be multiple instances of each component in the processing system 600.

The processing system 600 may include one or more processing devices 602, such as a processor, a microprocessor, an application-specific integrated circuit (ASIC), a field-programmable gate array (FPGA), a dedicated logic circuitry, or combinations thereof. The processing system 600 may also include one or more input/output (I/O) interfaces 604, which may enable interfacing with one or more appropriate input devices 614 and/or output devices 616. The processing system 600 may include one or more network interfaces 606 for wired or wireless communication with a network (e.g., an intranet, the Internet, a P2P network, a WAN and/or a LAN) or other node. The network interface(s) 606 may include wired links (e.g., Ethernet cable) and/or wireless links (e.g., one or more antennas) for intra-network and/or inter-network communications. The UNI and NNI described above may be implemented using the network interface(s) 606.

The network interfaces 606 may provide wireless communication via one or more transmitters or transmit antennas and one or more receivers or receive antennas, for example. In this example, a single antenna 618 is shown, which may serve as both transmitter and receiver. However, in other examples there may be separate antennas for transmitting and receiving. In some examples, there may be multiple antennas 618 that together form an antenna array (e.g., to enable beam tracking by a PCP/AP, as described above), in which case each antenna 618 may be referred to as an antenna element or radiating element of the antenna array. There may be a plurality of such antenna arrays.

The processing system 600 may also include one or more storage units 608, which may include a mass storage unit such as a solid state drive, a hard disk drive, a magnetic disk drive and/or an optical disk drive. The processing system 600 may include one or more memories 610, which may include a volatile or non-volatile memory (e.g., a flash memory, a random access memory (RAM), and/or a read-only memory (ROM)). The non-transitory memory(ies) 610 may store instructions for execution by the processing device(s) 602, such as to carry out examples described in the present disclosure, for example to perform encoding or decoding. The memory(ies) 610 may include other software instructions, such as for implementing an operating system and other applications/functions. For example, cluster management functions may be implemented using instructions stored in the memory(ies) 610. In some examples, one or more data sets and/or modules may be provided by an external memory (e.g., an external drive in wired or wireless communication with the processing system 600) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 612 providing communication among components of the processing system 600, including the processing device(s) 602, I/O interface(s) 604, network interface(s) 606, storage unit(s) 608 and/or memory(ies) 610. The bus 612 may be any suitable bus architecture including, for example, a memory bus, a peripheral bus or a video bus.

In FIG. 9, the input device(s) 614 (e.g., a keyboard, a mouse, a microphone, a touchscreen, and/or a keypad) and output device(s) 616 (e.g., a display, a speaker and/or a printer) are shown as external to the processing system 600. In other examples, one or more of the input device(s) 614 and/or the output device(s) 616 may be included as a component of the processing system 600. In other examples, there may not be any input device(s) 614 and output device(s) 616, in which case the I/O interface(s) 604 may not be needed.

In various examples, the disclosed BPAC BSS may enable backward compatibility, high efficiency over-the-air PCP/AP collaboration and/or higher throughput and lower latency service for a DMG STA. Backwards compatibility with legacy CCSS/ECPAC is also provided to enable to BPAC to join or leave the CCSS/ECPAC, for example.

In various examples, the present disclosure describes a synchronization mechanism, using a synchronization abstract MAC layer, for synchronization across two or more BPAC BSSs. The synchronization may be used to address the challenge presented by interference due to coverage-overlapping BPAC BSSs (including intra-cell interference and inter-cell interference).

Examples disclosed herein may be suitable for implementation in mmW communications and/or for WiFi hotspots, including high density networks.

It should be noted that although the examples disclosed herein describe a BPAC BSS as having multiple PCP/APs providing services to one or more STAs, a BPAC BSS may have a single PCP/AP. Even where the BPAC BSS has only a single PCP/AP, the disclosed reference model and reference architecture may still be used (e.g., there may still be a V-PCP/AP representation of the single PCP/AP of the BPAC BSS, and the single PCP/AP may function as the C-PCP/AP). This may be useful, for example, to enable additional PCP/APs to be added to the BPAC BSS with little or no disruption to the QoS/QoE of the STA(s) in the BPAC BSS. Likewise, using the disclosed reference model and reference architecture, PCP/APs may be removed from a BPAC BSS, leaving at least one PCP/AP in the BPAC BSS, with little or no disruption to the QoS/QoE of the STA(s) in the BPAC BSS.

In an example A1 of the present disclosure, there is provided an apparatus for wireless communications comprising: a network interface configured for wireless communication with at least one electronic device (ED) and one or more member personal basic service set (PBSS) control points (PCPs)/access points (APs) within a basic service set (BSS) PCP/AP cluster (BPAC) BSS; and a processor coupled to the network interface and configured to: coordinate beam coverage functions and operations of the one or more member PCP/APs within the BPAC BSS, to provide coverage of the ED within the BPAC BSS; manage scheduling of communications from the one or more member PCP/APs within the BPAC BSS, to reduce interference; and implement a virtual PCP/AP, the virtual PCP/AP providing a representation of all PCP/APs in the BPAC BSS as the single virtual PCP/AP; wherein the ED interfaces with the BPAC BSS via the virtual PCP/AP.

In an example A2 of the present disclosure, there is provided the apparatus of example A1 wherein the apparatus is a coordinator PCP/AP within the BPAC BSS.

In an example A3 of the present disclosure, there is provided the apparatus of example A1 wherein wireless communication with the at least one ED is performed over a physical (PHY) layer via a user-network interface.

In an example A4 of the present disclosure, there is provided the apparatus of example A1 wherein wireless communication with the one or more member PCP/AP is performed over a media control access (MAC) layer via a network-network interface.

In an example A5 of the present disclosure, there is provided the apparatus of example A1 wherein an authentication function is implemented by the virtual PCP/AP, the authentication function enabling authentication of the ED to the BPAC BSS using a single authentication with the virtual PCP/AP.

In an example A6 of the present disclosure, there is provided the apparatus of example A1 wherein coordination of beam coverage functions and operations include coordination of beamforming and beam tracking.

In an example A7 of the present disclosure, there is provided a system for wireless communications comprising: a basic service set (BSS) personal BSS control points (PCPs)/access points (APs) cluster (BPAC) BSS including: two or more PCP/APs, the two or more PCP/APs including a coordinator PCP/AP and one or more member PCP/APs managed by the coordinator PCP/AP; and at least one electronic device (ED) serviced by at least one of the two or more PCP/APs; and wherein a virtual PCP/AP is implemented by at least one of the two or more PCP/APs, the virtual PCP/AP providing a representation of all PCP/APs in the BPAC BSS as the single virtual PCP/AP.

In an example A8 of the present disclosure, there is provided the system of example A7 further comprising: a legacy centralized coordination service root (CCSR) within a centralized coordination service set (CCSS) configured to provide clustering coordination functions to the BPAC BSS and a legacy BSS; wherein a BPACSS layer inherits a service set from the legacy BSS and represents the BPAC BSS as a legacy BSS to the CCSR.

In an example B1 of the present disclosure, there is provided an apparatus for wireless communications comprising: a network interface configured for wireless communication with one or more electronic devices (EDs) and one or more personal basic service set (PBSS) control points (PCPs)/access points (APs) of two or more BSS PCP/AP cluster (BPAC) basic service sets (BSSs); and a processor coupled to the network interface and configured to: transmit synchronization signals to the EDs and PCP/APs of the two or more BPAC BSSs to synchronize transmissions in the two or more BPAC BSSs, via a synchronization layer at least partially implemented by the apparatus in the media access control (MAC) layer; and relay communications between the two or more BPAC BSSs via the synchronization layer.

In an example B2 of the present disclosure, there is provided the apparatus of example B1 wherein each BPAC BSS includes a coordinator PCP/AP and at least one member PCP/AP, the coordinator PCP/AP coordinating communications among PCP/APs within each BPAC BSS.

In an example B3 of the present disclosure, there is provided the apparatus of example B1 wherein the apparatus is an inter BPAC BSS PCP/AP that is shared among the two or more BPAC BSSs.

In an example B4 of the present disclosure, there is provided the apparatus of example B1 wherein the synchronization layer is implemented across all EDs and PCP/APs of the two or more BPAC BSSs in the MAC layer.

In an example B5 of the present disclosure, there is provided the apparatus of example B4 wherein each BPAC BSS is represented as a single virtual PCP/AP in the MAC layer, and the synchronization layer synchronizes the two or more BPAC BSSs across the virtual PCP/APs.

In an example B6 of the present disclosure, there is provided a system for wireless communications comprising: at least two basic service set (BSS) PCP/AP cluster (BPAC) BSSs, each BPAC BSS including: two or more personal BSS control points (PCPs)/access points (APs), the two or more PCP/APs including a coordinator PCP/AP and one or more member PCP/APs managed by the coordinator PCP/AP; and at least one electronic device (ED) serviced by at least one of the two or more PCP/APs; wherein the at least two BPAC BSSs share at least one PCP/AP, the shared PCP/AP being an inter BPAC BSS PCP/AP; wherein the inter BPAC BSS PCP/AP is configured to: transmit synchronization signals to the EDs and PCP/APs of the at least two BPAC BSSs to synchronize transmissions in the at least two BPAC BSSs, via a synchronization layer implemented in the media access control (MAC) layer; and relay communications between the at least two BPAC BSSs via the synchronization layer.

In an example B7 of the present disclosure, there is provided the system of example B6 wherein each BPAC BSS is represented as a single virtual PCP/AP in the MAC layer, and the synchronization layer synchronizes the at least two BPAC BSSs across the virtual PCP/APs.

In an example B8 of the present disclosure, there is provided the system of example B6 wherein each BPAC BSS includes a coordinator PCP/AP and at least one member PCP/AP, the coordinator PCP/AP coordinating communications among PCP/APs within each BPAC BSS.

In an example B9 of the present disclosure, there is provided the system of example B6 wherein the synchronization layer is implemented across all EDs and PCP/APs of the at least two BPAC BSSs in the MAC layer.

In an example B10 of the present disclosure, there is provided an apparatus for wireless communications comprising: a network interface configured for wireless communication with at least one electronic device (ED) and one or more member personal basic service set (PBSS) control points (PCPs)/access points (APs) within a basic service set (BSS) PCP/AP cluster (BPAC) BSS; and a processor coupled to the network interface unit and configured to: transmit synchronization signals to the at least one ED and the one or more PCP/APs to synchronize transmission between the at least one ED and the one or more PCP/APs of the BPAC BSS, via a synchronization layer at least partially implemented by the apparatus in the media access control (MAC) layer.

In an example B11 of the present disclosure, there is provided the apparatus of example B10 wherein the synchronization layer is implemented across all EDs and PCP/APs of the BPAC BSS in the MAC layer.

In an example B12 of the present disclosure, there is provided the apparatus of example B10 wherein the one or more PCP/APs are represented as a virtual PCP/AP in the MAC layer, and wherein communication of synchronization signals in the synchronization layer is controlled by the virtual PCP/AP.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An apparatus for wireless communications comprising:
   a network interface configured for wireless communication with two or more personal basic service set (PBSS) control points (PCPs)/access points (APs), the two or more PCPs/APs serving within one BSS PCP/AP cluster (BPAC) basic service set (BSS); and
   a processor coupled to the network interface and configured to:
      transmit synchronization signals to one or more electronic devices (EDs) of the one BPAC BSS and to the two or more PCP/APs of the one BPAC BSS to synchronize transmissions within the one BPAC BSS.

2. The apparatus of claim 1 wherein the synchronization signals are transmitted via a synchronization layer at least partially implemented by the apparatus in a media access control (MAC) layer, and wherein synchronization signals within the one BPAC BSS are transmitted via the synchronization layer.

3. The apparatus of claim 1 wherein the one BPAC BSS includes a coordinator PCP/AP and at least one member PCP/AP, the coordinator PCP/AP further coordinating communications among the two or more PCP/APs within the one BPAC BSS.

4. The apparatus of claim 1 wherein the network interface is configured for wireless communication with at least one PCP/AP in each of two or more BPAC BSSs, and wherein the processor is configured to transmit synchronization signals to the respective PCP/APs of the two or more BPAC BSSs to synchronize transmissions between the two or more BPAC BSSs.

5. The apparatus of claim 4 wherein the apparatus is an inter BPAC BSS PCP/AP that operates within each of the two or more BPAC BSSs.

6. The apparatus of claim 4 wherein each BPAC BSS is represented as a respective single virtual PCP/AP, and the synchronization layer synchronizes the two or more BPAC BSSs across the virtual PCP/APs.

7. The apparatus of claim 4 wherein the processor is configured to relay communications between the two or more BPAC BSSs.

8. The apparatus of claim 1 wherein the processor is further configured to implement a single virtual PCP/AP, the single virtual PCP/AP providing a representation of all PCP/APs in the one BPAC BSS as the single virtual PCP/AP.

9. An apparatus for wireless communications comprising:
   a network interface configured for wireless communication with at least one or personal basic service set (PBSS) control points (PCPs)/access points (APs) serving in each of two or more BSS PCP/AP cluster (BPAC) basic service sets (BSSs), wherein at least one BPAC BSS has two or more PCP/APs serving within the one BPAC BSS; and
   a processor coupled to the network interface and configured to:
      transmit synchronization signals to the PCP/APs of the two or more BPAC BSSs to synchronize transmissions between the two or more BPAC BSSs.

10. The apparatus of claim 9 wherein the synchronization signals are transmitted via a synchronization layer at least partially implemented by the apparatus in a media access control (MAC) layer, and wherein the synchronization signals to the two or more BPAC BSSs are transmitted via the synchronization layer.

11. The apparatus of claim 9 wherein the apparatus is an inter BPAC BSS PCP/AP that operates within each of the two or more BPAC BSSs.

12. The apparatus of claim 9 wherein each BPAC BSS is represented as a respective single virtual PCP/AP, and the synchronization layer synchronizes the two or more BPAC BSSs across the virtual PCP/APs.

13. The apparatus of claim 9 wherein the two or more PCP/APs serving within the one BPAC BSS are represented by the respective single virtual PCP/AP to the one BPAC BSS.

14. A method for managing wireless communications, the method comprising:
   transmitting synchronization signals to one or more electronic devices (EDs) of one BSS PCP/AP cluster (BPAC) basic service set (BSS) and to two or more personal basic service set (PBSS) control points (PCPs)/access points (APs), the two or more PCPs/APs serving within the one BPAC BSS, to synchronize transmissions within the one BPAC BSS.

15. The method of claim 14 wherein the synchronization signals are transmitted via a synchronization layer at least partially implemented in a media access control (MAC) layer, and wherein synchronization signals within the one BPAC BSS are transmitted via the synchronization layer.

16. The method of claim 14 further comprising:
    transmitting synchronization signals to respective PCP/APs of two or more BPAC BSSs to synchronize transmissions between the two or more BPAC BSSs.

17. The method of claim 16 wherein the method is performed by an inter BPAC BSS PCP/AP that operates within each of the two or more BPAC BSSs.

18. The method of claim 16 wherein each BPAC BSS is represented as a respective single virtual PCP/AP, and wherein the synchronization signals are transmitted to synchronize the two or more BPAC BSSs across the virtual PCP/APs.

19. The method of claim 16 further comprising:
    relaying communications between the two or more BPAC BSSs.

20. The method of claim 14 wherein the two or more PCP/APs serving within the one BPAC BSS are represented by a single virtual PCP/AP.

\* \* \* \* \*

UNITED STATES PATENT AND TRADEMARK OFFICE
CERTIFICATE OF CORRECTION

PATENT NO. : 11,323,878 B2
APPLICATION NO. : 17/011840
DATED : May 3, 2022
INVENTOR(S) : Sun et al.

It is certified that error appears in the above-identified patent and that said Letters Patent is hereby corrected as shown below:

In the Claims

In Column 16, Lines 35 and 36 (Claim 9): "tion with at least one or personal basic service set (PBSS) control points (PCPs)/ access points (APs) serv-" should read --tion with at least one personal basic service set (PBSS) control point (PCP)/ access point (AP) serv- --

Signed and Sealed this
Twelfth Day of July, 2022

Katherine Kelly Vidal
*Director of the United States Patent and Trademark Office*